Patented July 9, 1935

2,007,492

UNITED STATES PATENT OFFICE 2,007,492

SULPHURIC REACTION PRODUCTS OF ALIPHATIC HYDROXY CARBOXYLIC ACIDS

Heinrich Bertsch, Chemnitz, Germany, assignor to the firm H. Th. Böhme Aktiengesellschaft, Chemnitz, Germany No Drawing. Application March 12, 1931, Serial No. 522,169. In Germany March 13, 1930

7 Claims. (Cl. 260—99.12)

This invention relates to processes of preparing sulphated oils adapted as wetting or moistening agents.

More particularly the invention is directed to the production of such agents by sulphating higher aliphatic hydroxy-polycarboxylic acid derivatives, said derivatives being derived from said acid by reducing one or more of said carboxyl groups to a $CH_2OH$ group and esterifying the remaining carboxyl groups either before or after the reduction step with alcohol residues.

According to known processes of making sulphonated oils for this use, fatty acids or their glycerides are converted into water-soluble sulphonic acid compounds by the action of a sulphonating agent upon either the unsaturated carbon atoms or the hydroxyl groups of the fatty compounds. It has also been proposed to use, instead of carboxylic acids, the corresponding higher aliphatic mono-hydroxy alcohols as the initial material for the sulphonation. It was found that the sulphonates of these compounds, due to the absence of carboxyl groups, are non-sensitive to calcium and magnesium salts present in hard water and are noteworthy because of their very good softening and smoothing properties.

Furthermore, it has been proposed to employ fatty acids esterified with aliphatic, hydro-aromatic, or aromatic alcohols or with phenols as the initial material for the preparation of the sulphonated oils, with the result that the products made therefrom are many times more efficient as moistening agents than the agents made from free fatty acids or their glycerides.

The products prepared according to the method of the present invention are extremely valuable in possessing the good properties of both of the above described sulphonated oil products.

In proceeding in accordance with the present invention, certain derivatives of higher aliphatic dicarboxylic or poly-carboxylic acids are sulphated. The acids from which the derivatives are formed may be prepared by reacting a halogen hydrid with higher aliphatic unsaturated compounds, for example, unsaturated fatty acids, converting the resulting halogen hydride addition product by means of potassium cyanide and saponifying the nitriles formed, into polybasic acids.

In producing the derivatives, the carboxyl groups of these polybasic acids are then either quantitatively reduced to a $CH_2OH$ group or only partially reduced and the remaining ones either before or after the reduction are esterified by the reaction of alcohols or phenols therewith. The resulting derivative compounds are either higher aliphatic poly-hydroxy alcohols or esters of higher aliphatic hydroxy acids.

The derivatives are then sulphated in a manner known per se, the method of sulphating forming no part of the present invention.

Example 1

One hundred kilograms of the dibutyl ester made by the addition of hydrogen bromide in solution in acetic acid to ricinoleic acid, conversion of the bromo-hydroxy-stearic acid with potassium cyanide, saponification of the nitrile and the esterification of the resulting hydroxy dicarboxylic acid with butyl alcohol are reduced by treatment with that amount of sodium and ethyl alcohol necessary to react with one ester group. For instance, the amount of these substances used is in the proportion of 4 atoms of sodium and 4 molecules of ethyl alcohol per mol. of the dibutyl ester of heptadecanol dicarboxylic acid. Thus by weight, 22 kgs. of sodium and 44 kgs. of ethyl alcohol may be used, although it is obvious that the amount of these substances may be slightly in excess of the theoretical quantity. The reaction product, the butyl ester of octadecandiol carboxylic acid, is sulphated, as by adding thereto four times as much of concentrated sulphuric acid at a temperature between $-5°$ and $0°$ C., whereby the hydroxyl groups are converted into sulphuric acid ester groups. After washing this product with a saturated solution of Glauber's salt and neutralization with soda lye, there is obtained a product which goes into solution in water very quickly and which moistens very readily.

Example 2

The dibutyl ester of the hydroxy carboxylic acid prepared as described in Example 1 is reduced with the amount of sodium and ethyl alcohol needed to react with two ester groups. For instance, the amounts may be in the proportion of 8 atoms of sodium and 8 molecules of ethyl alcohol to 1 mol. of the dibutyl ester of heptadecanol dicarboxylic acid. The reduction may be aided by treatment with hydrogen under pressure. The product formed is an eicosantriol which upon sulphation in accordance with known methods yields preparations which have, to an increased degree, the advantageous properties of the sulphonates of fatty alcohols previously described.

The sulphated oil products of the present invention are especially desirable because of their high solubility in water, high moistening power, and their resistance to acids. These qualities are thought due at least in part to the larger number of sulphated hydroxyl groups and the introduction of ester groups. Their stability against calcium and magnesium salts is very good because of the absence of free carboxyl groups.

Having thus described my invention, what is claimed as new and desired to be secured by Letters Patent is:

1. The process of preparing sulphated oils comprising sulphating a higher aliphatic hydroxy-polycarboxylic acid derivative compound having more than 8 carbon atoms, said compound being a derivative of an acid of the described character in which at least one carboxyl group has been replaced by a CH₂OH group and any carboxyl group not replaced has been esterified by a compound selected from the group consisting of phenols and monohydroxy alcohols.

2. The process of preparing sulphated oils comprising reducing at least one carboxyl group of a higher aliphatic hydroxy-polycarboxylic acid having more than 8 carbon atoms to a group CH₂OH, then esterifying any remaining carboxyl groups by a compound selected from the group consisting of phenols and monohydroxy alcohols and sulphating the resulting product.

3. The process of preparing sulphated oils comprising esterifying a higher aliphatic hydroxy-polycarboxylic acid having more than 8 carbon atoms by a compound selected from the group consisting of phenols and monohydroxy alcohols, then reducing at least one of the ester groups to a CH₂OH group, and finally sulphating the resulting product.

4. The process of preparing sulphated oils comprising reducing the carboxylic groups of a higher aliphatic hydroxy-polycarboxylic acid having more than 8 carbon atoms to CH₂OH groups and sulphating the resulting product.

5. The process of preparing sulphated oils comprising sulphating a higher aliphatic compound of the general formula $$C_nH_{2n+2-k-m}(COOX)_k(CH_2OH)_m,$$

wherein X is H or lower alkyl or phenyl, $k$ is an integer or zero, $m$ and $n$ are integers, $k+m$ is at least 2, and $k+m+n$ is more than 8.

6. The process of preparing sulphated oils comprising esterifying a higher aliphatic hydroxy-polycarboxylic acid having more than 8 carbon atoms by a compound selected from the group consisting of phenols and monohydroxy alcohols and reducing at least one group COOX, wherein X is H or lower alkyl or phenyl to a group CH₂OH, and sulphating the resulting product.

7. A dispersing agent comprising in substantial quantity a sulphuric acid ester of a higher aliphatic compound of the general formula $$C_nH_{2n+2-k-m}(COOX)_k(CH_2OH)_m.$$

wherein X is H or lower alkyl or phenyl, $k$ is an integer or zero, $m$ and $n$ are integers, $k+m$ is at least 2, and $k+m+n$ is more than 8.

HEINRICH BERTSCH.